US010533527B2

United States Patent
Kim et al.

(10) Patent No.: US 10,533,527 B2
(45) Date of Patent: Jan. 14, 2020

(54) INTAKE AIR CONTROL APPARATUS FOR VEHICLE

(71) Applicants: Hyundai Motor Company, Seoul (KR); Kia Motors Corporation, Seoul (KR)

(72) Inventors: Jin Ha Kim, Gunpo-Si (KR); Seung Jae Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/822,674

(22) Filed: Nov. 27, 2017

(65) Prior Publication Data

US 2018/0355825 A1      Dec. 13, 2018

(30) Foreign Application Priority Data

Jun. 9, 2017   (KR) ........................ 10-2017-0072539

(51) Int. Cl.
  *F02M 35/10*     (2006.01)
  *F02M 35/108*    (2006.01)

(52) U.S. Cl.
  CPC .... *F02M 35/108* (2013.01); *F02M 35/10091* (2013.01); *F02M 35/10222* (2013.01); *F02M 35/10255* (2013.01)

(58) Field of Classification Search
  CPC .......... F02B 31/04; F02B 31/06; F02B 31/08; F02M 35/10; F02M 35/108; F02M 35/10065; F02M 35/10091; F02M 35/1022; F02M 35/10225

USPC ......... 123/184.47, 184.53, 184.56, 306, 308, 123/337, 432
See application file for complete search history.

(56) References Cited

U.S. PATENT DOCUMENTS

| | | | | |
|---|---|---|---|---|
| 4,365,600 A | * | 12/1982 | Nakada ................... | F02D 11/08 123/336 |
| 4,919,087 A | * | 4/1990 | Ogami ................... | F02B 27/02 123/184.36 |
| 4,957,071 A | * | 9/1990 | Matsuo ................... | F02B 27/02 123/184.36 |
| 4,970,994 A | * | 11/1990 | Sawada ................... | F02F 1/242 123/184.35 |
| 5,263,440 A | * | 11/1993 | Bodnar ................. | F02B 27/021 123/184.31 |
| 6,178,943 B1 | * | 1/2001 | Taga ....................... | F02D 37/02 123/295 |

(Continued)

FOREIGN PATENT DOCUMENTS

KR   20-1996-0008470   3/1996

*Primary Examiner* — John Kwon
*Assistant Examiner* — Johnny H Hoang
(74) *Attorney, Agent, or Firm* — Morgan, Lewis & Bockius LLP (57) ABSTRACT

An air intake control apparatus for a vehicle may include an intake passage configured such that a flow pipe for a flow of intake air is divided into first and second division passages and the first and second division passages communicate with the same combustion chamber, a variable valve provided in the first division passage to adjust an opening degree of the first division passage according to an rotation angle of a motor connected to a central shaft of the variable valve, and an operation valve provided in the second division passage to open or close the second division passage by ON/OFF control.

5 Claims, 6 Drawing Sheets

(56) References Cited

U.S. PATENT DOCUMENTS

| | | | | |
|---|---|---|---|---|
| 6,234,139 B1* | 5/2001 | Taga | | F02D 41/0002 |
| | | | | 123/295 |
| 6,293,247 B1* | 9/2001 | Sasaki | | F02B 31/085 |
| | | | | 123/308 |
| 6,499,456 B1* | 12/2002 | Nogi | | F02B 1/12 |
| | | | | 123/295 |
| 6,805,087 B2* | 10/2004 | Yakabe | | F02B 27/0252 |
| | | | | 123/184.25 |
| 6,874,465 B2* | 4/2005 | Arimatsu | | F02B 31/04 |
| | | | | 123/188.14 |
| 7,025,029 B2* | 4/2006 | Vichinsky | | F02B 75/22 |
| | | | | 123/184.34 |
| 7,322,332 B2* | 1/2008 | Abe | | F02M 35/10026 |
| | | | | 123/184.34 |
| 7,856,957 B2* | 12/2010 | Fornara | | F02B 31/085 |
| | | | | 123/184.53 |
| 8,146,564 B2* | 4/2012 | Zhang | | F02D 9/1095 |
| | | | | 123/308 |
| 8,662,054 B2* | 3/2014 | Omura | | F02D 41/0002 |
| | | | | 123/306 |
| 9,951,678 B1* | 4/2018 | Kim | | F02B 31/08 |
| 2003/0106508 A1* | 6/2003 | Rosskamp | | F02B 25/22 |
| | | | | 123/73 PP |
| 2004/0045533 A1* | 3/2004 | Sukegawa | | F02D 13/0226 |
| | | | | 123/478 |
| 2004/0123849 A1* | 7/2004 | Bryant | | F01B 7/12 |
| | | | | 123/563 |
| 2005/0155570 A1* | 7/2005 | Confer | | F02B 31/06 |
| | | | | 123/306 |
| 2006/0005818 A1* | 1/2006 | Kuo | | F02D 13/0207 |
| | | | | 123/568.13 |
| 2006/0048738 A1* | 3/2006 | Isaji | | F02B 31/06 |
| | | | | 123/184.56 |
| 2006/0283429 A1* | 12/2006 | Kuhnel | | F02B 31/085 |
| | | | | 123/568.18 |
| 2008/0271696 A1* | 11/2008 | Tominaga | | F02B 31/04 |
| | | | | 123/184.53 |
| 2009/0007874 A1* | 1/2009 | Abe | | F02B 27/02 |
| | | | | 123/184.47 |
| 2014/0174401 A1* | 6/2014 | Hattori | | F02B 31/06 |
| | | | | 123/337 |
| 2015/0330340 A1* | 11/2015 | Oiwa | | F02B 27/0215 |
| | | | | 123/184.38 |
| 2018/0171887 A1* | 6/2018 | Ulrey | | F02M 26/14 |

* cited by examiner

INTAKE AIR CONTROL APPARATUS FOR VEHICLE

CROSS REFERENCE TO RELATED APPLICATION

The present application claims priority of Korean Patent Application No. 10-2017-0072539 filed on Jun. 9, 2017, the entire contents of which is incorporated herein for all purposes by this reference.

BACKGROUND OF THE INVENTION

Field of the Invention

The present invention relates to an air intake control apparatus for a vehicle, and, more particularly, to an apparatus for controlling intake air introduced into an engine.

Description of Related Art

An engine may be provided with a plurality of combustion chambers and a passage for the flow of intake air to each of the combustion chambers. The passage may be provided with a valve that regulates a flow rate of intake air by adjusting a flow cross-sectional area of intake air.

Meanwhile, an amount of intake air introduced into each combustion chamber of the engine may be regulated according to the traveling condition of a vehicle, in which case the amount of intake air may be regulated by the valve. Regulating the proper flow of intake air introduced into the combustion chamber for each traveling condition is an important subject for the vehicle.

The foregoing is intended merely to aid in the understanding of the background of the present invention, and is not intended to mean that the present invention falls within the purview of the related art which is already known to those skilled in the art.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air intake control apparatus for a vehicle, configured for having a simple structure and simultaneously regulating a flow of intake air according to the mode of a vehicle.

In accordance with an aspect of the present invention, an air intake control apparatus for a vehicle may include an intake passage configured such that a flow pipe for a flow of intake air is divided into first and second division passages and the first and second division passages communicate with the same combustion chamber, a variable valve provided in the first division passage to adjust an opening degree of the first division passage, and an operation valve provided in the second division passage to open or close the second division passage by ON/OFF control.

The opening degree of the first division passage is determined by an angle of rotation of a motor connected to a central shaft of the variable valve.

The air intake control apparatus may further include a controller configured to control the angle of rotation of the motor according to a traveling mode of a vehicle to adjust an angle of rotation of the variable valve, and to control the operation valve in an ON/OFF manner.

The operation valve may be a negative pressure valve.

The first division passage may be a filling port communicating with the combustion chamber, and the second division passage may be a swirl port that communicates with an eccentric point in the combustion chamber to induce a swirl in the combustion chamber.

The controller may be configured to control the angle of rotation of the motor to adjust an opening degree of the variable valve and may cause the second division passage to be maintained in an open state, in a normal mode corresponding to a typical traveling condition of the vehicle.

The controller may be configured to control the angle of rotation of the motor of the variable valve to close the first division passage, and may close the second division passage in a regeneration mode of a Lean NOx Trap (LNT) device provided on an exhaust passage.

The first division passage may be a swirl port that communicates with an eccentric point in the combustion chamber to induce a swirl in the combustion chamber, and the second division passage may be a filling port communicating with the combustion chamber.

The controller may be configured to control the angle of rotation of the motor to adjust an opening degree of the variable valve and may cause the second division passage to be maintained in an open state, in a regeneration mode of a diesel particulate filter (DPF) device provided on an exhaust passage.

The controller may be configured to control the angle of rotation of the motor of the variable valve to close the first division passage and may close the second division passage in a regeneration mode of an LNT device provided on an exhaust passage.

As apparent from the above description, the air intake control apparatus for a vehicle having the above-mentioned structure can have a simple structure and simultaneously regulate a flow of intake air by controlling the plurality of valves according to the mode of the vehicle.

In particular, since the variable valve is operated by the motor and the operation valve is controllable using the negative pressure of the intake device in an exemplary embodiment of the present invention, it is possible to reduce power consumption and volume package due to application of a large number of motors.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An air intake control apparatus for a vehicle according to the exemplary embodiments of the present invention will be described below with reference to the accompanying drawings.

Figure 1:
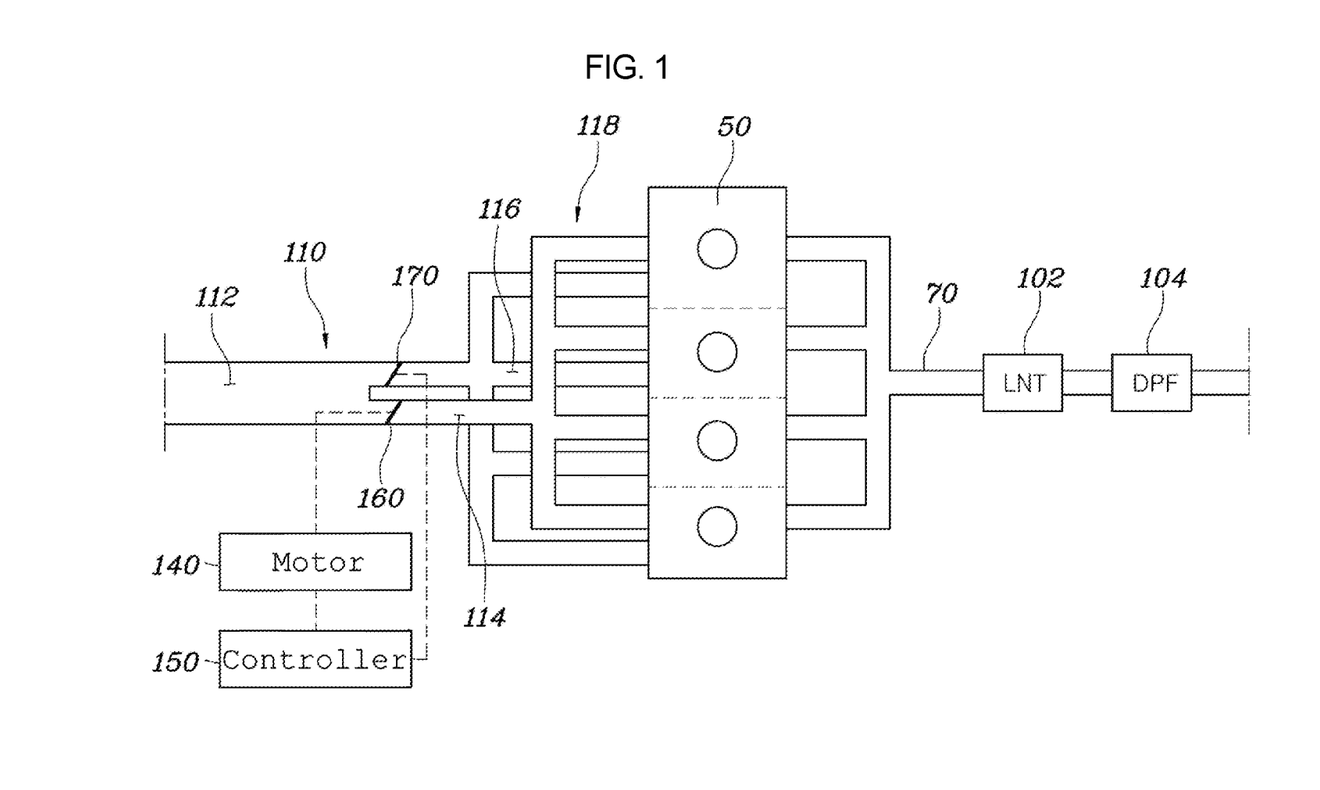
FIG. 1 is a diagram illustrating an intake and exhaust system provided with an air intake control apparatus for a vehicle according to an exemplary embodiment of the present invention.
Figure 2:
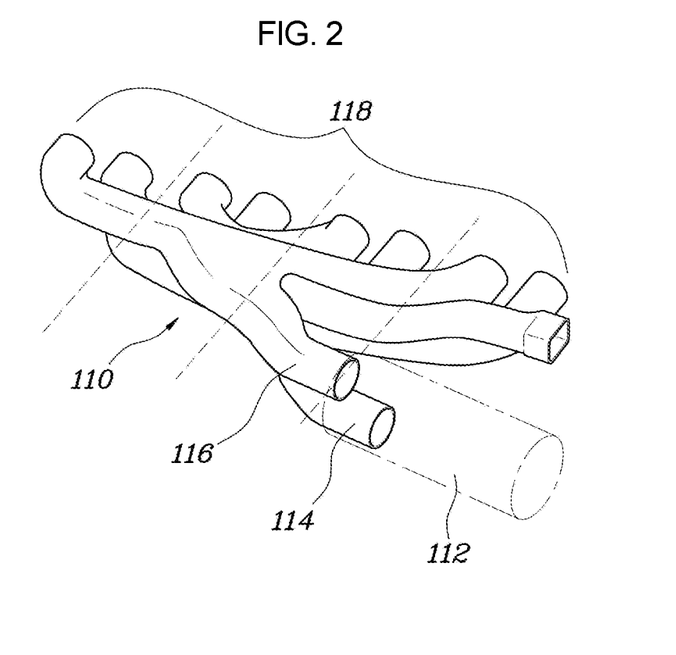
FIG. 2 is a view illustrating an intake passage to which the air intake control apparatus for a vehicle according to an exemplary embodiment of the present invention is mounted.

FIG. 1 is a diagram illustrating an intake and exhaust system provided with an air intake control apparatus for a vehicle according to an exemplary embodiment of the present invention. FIG. 2 is a view illustrating an intake passage to which the air intake control apparatus for a vehicle according to an exemplary embodiment of the present invention is mounted.

Referring to FIG. 1 and FIG. 2, the air intake control apparatus for a vehicle according to an exemplary embodiment of the present invention may include an intake passage 110 in which a flow pipe 112 for the flow of intake air is divided into first and second division passages 114 and 116 and the first and second division passages 114 and 116 communicate with the same combustion chamber, a variable valve 160 which is provided in the first division passage 114 to adjust the opening degree of the first division passage 114, and an operation valve 170 which is provided in the second division passage 116 to open or close the second division passage 116 by ON/OFF control.

The opening degree of the first division passage 114 is determined by an angle of rotation of a motor 140 connected to a central shaft of the variable valve 160.

The intake passage 110 is configured such that the flow pipe 112 for the flow of intake air is divided into a plurality of division passages, i.e. first and second division passages 114 and 116 and the division passages communicate with the same combustion chamber.

The intake passage 110 is a flow path in which intake air flows toward an engine 50. In an exemplary embodiment of the present invention, the intake passage 110 is provided with the flow pipe 112 having a space therein, and the flow pipe 112 is divided into the first division passage 114 and the second division passage 116 at the downstream side thereof with respect to the flow of intake air.

The flow pipe 112 may be divided in various manners. For example, the flow pipe 112 may be branched to form a plurality of pipe, or the flow pipe 112 may have a partition wall that longitudinally extends therein, while the pipe-shaped external wall of the flow pipe 112 is maintained as it is, to form first and second division passages 114 and 116 therein.

FIG. 1 and FIG. 2 schematically illustrate that the flow pipe 112 is branched into a plurality of pipes 118 to form division passages 114 and 116. FIG. 1 and FIG. 2 illustrates an exemplary embodiment of the intake passage 110 in which the flow pipe 112 is divided into two division passages 114 and 116 at the downstream side thereof.

Meanwhile, the engine 50 has a plurality of combustion chambers formed therein, and the division passages 114 and 116 communicate with the combustion chambers corresponding to them. That is, the intake air passing through the division passage 114 and the intake air passing through the division passage 116 are ultimately mixed with each other in the respective combustion chambers.

Figure 3:
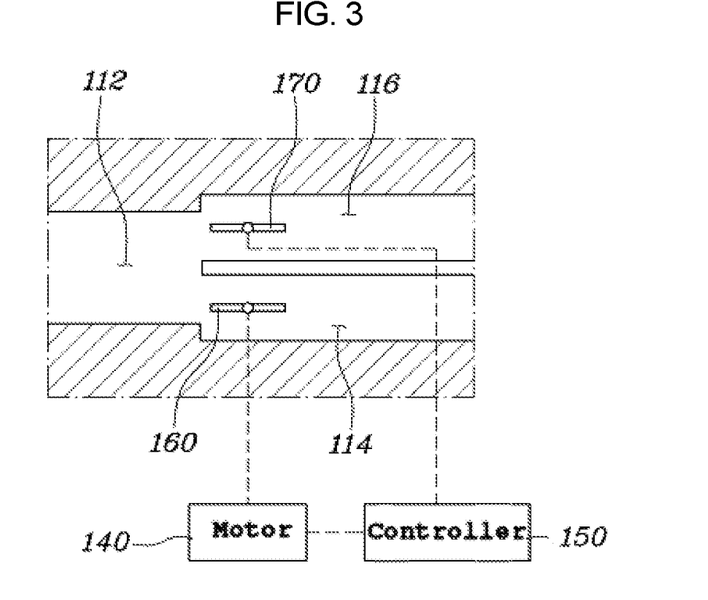
FIG. 3 is a view illustrating a reference state of an air intake control apparatus for a vehicle according to various exemplary embodiments of the present invention.
Figure 4:
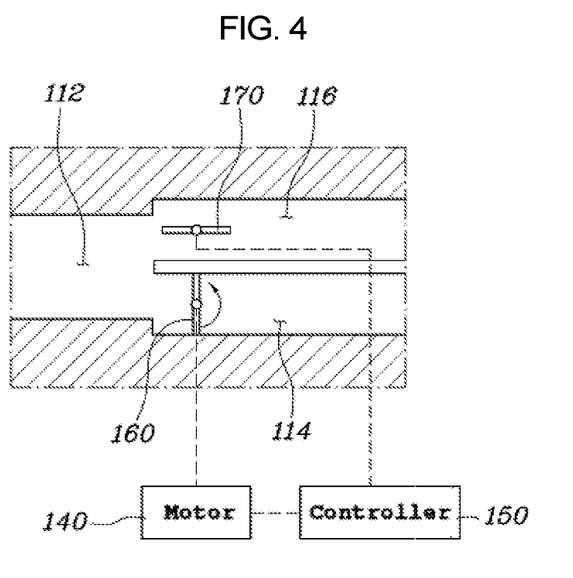
FIG. 4 is a view illustrating a state in which a variable valve is closed and an operation valve is turned off in the air intake control apparatus for a vehicle according to the various exemplary embodiments of the present invention.
Figure 5:
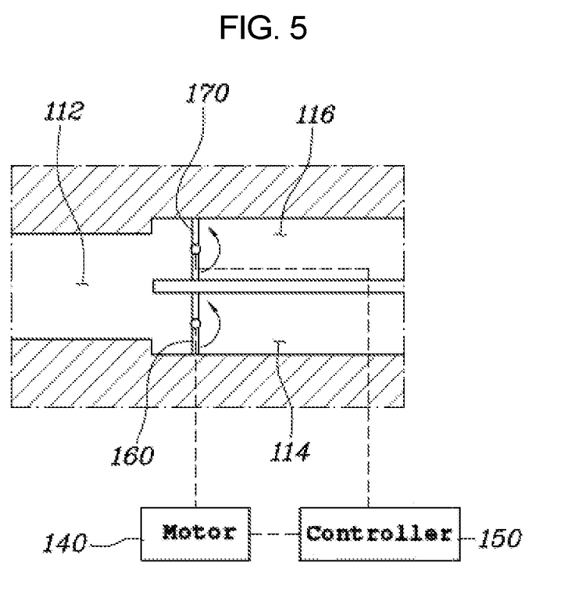
FIG. 5 is a view illustrating a state in which the variable valve is closed and the operation valve is turned on in the air intake control apparatus for a vehicle according to the various exemplary embodiments of the present invention.

FIG. 3 is a view illustrating a reference state of an air intake control apparatus for a vehicle according to various exemplary embodiments of the present invention. FIG. 4 is a view illustrating a state in which a variable valve is closed and an operation valve is turned off in the air intake control apparatus for a vehicle according to the various exemplary embodiments of the present invention. FIG. 5 is a view illustrating a state in which the variable valve is closed and the operation valve is turned on in the air intake control apparatus for a vehicle according to the various exemplary embodiments of the present invention.

Referring to FIG. 3, FIG. 4, and FIG. 5, in the air intake control apparatus for a vehicle according to the various exemplary embodiments of the present invention, a variable valve 160 is provided in a first division passage 114 to adjust the opening degree of the first division passage 114 according to the angle of rotation of a motor 140 connected to the central shaft of the variable valve 160.

In the various exemplary embodiments, the variable valve 160 is used to form a swirl of intake air introduced into a combustion chamber. That is, the first and second division passages 114 and 116 communicate with the same combustion chamber, in which case when the opening degree of the first division passage 114 having the variable valve 160 therein is "0" (the first division passage 114 is fully closed) so that the flow of intake air is blocked, only intake air passing through the second division passage 116 is introduced into the combustion chamber. In the instant case, the intake air introduced into the combustion chamber unevenly flow in the combustion chamber, compared to when both of the division passages 114 and 116 are open.

For example, when both of the intake air passing through the first division passage 114 and the intake air passing through the second division passage 116 are introduced into the combustion chamber, the present intake air evenly flows into the combustion chamber. However, when the first division passage 114 is closed by the variable valve 160 so that intake air is introduced into the combustion chamber only through the second division passage 116, the flow of the intake air is not even but is biased in the combustion chamber. Accordingly, since a swirl is formed by the biased flow of the intake air, the valve provided in the first division passage 114 is defined as the variable valve 160. Furthermore, the first division passage 114 is defined as a filling port communicating with the combustion chamber, and the second division passage 116 is defined as a swirl port that communicates with an eccentric point in the combustion chamber to induce a swirl in the combustion chamber.

Meanwhile, an operation valve 170 is provided in the second division passage 116 to open or close the second division passage 116 by ON/OFF control.

The operation valve 170 is operated together with the variable valve 160 and closes both of the division passages 114 and 116 to block an amount of intake air introduced into the combustion chamber.

Especially, the operation valve 170 is not operated by an actuator including a motor, but is turned on/off in response to the control signal of a controller 150. Thus, the operation valve 170 is advantageous in that it reduces the cost and weight of parts by preventing the application of a large number of motors thereto.

In the case where the variable valve 160 and the operation valve 170 are disposed, there is no need to provide an air control valve (ACV) in the flow pipe 112 to block an amount of intake air introduced into the combustion chamber.

In an exemplary embodiment of the present invention, the air intake control apparatus for a vehicle may further include a controller 150 that controls the angle of rotation of the motor 140 according to the traveling mode of the vehicle to adjust the angle of rotation of the variable valve 160, and controls the operation valve 170 in an ON/OFF manner.

That is, the controller 150 may adjust the opening degree of the variable valve 160 according to the traveling condition of the vehicle, may adjust the amount of intake air introduced into the combustion chamber by the ON/OFF control of the operation valve 170, or may cause the swirl to be formed in the combustion chamber.

Here, the operation valve 170 may be a negative pressure valve.

The negative pressure valve is typically operated in an ON/OFF manner by the operation of a diaphragm according to whether or not vacuum is formed therein. In the instant case, vacuum may be formed in the negative pressure valve using a conventional device including an air pump or a surge tank, mounted in the vehicle. Accordingly, since the operation valve 170 is controllable in an ON/OFF manner without a separate actuator, it is effective in terms of the weight, volume, and cost of the vehicle.

In more detail, in the various exemplary embodiments, the controller 150 controls the angle of rotation of the motor 140 to adjust the opening degree of the variable valve 160 and the second division passage 116 to be maintained in an open state by the OFF control of the operation valve 170, in a normal mode corresponding to the typical traveling condition of the vehicle.

In an exemplary embodiment of the present invention, the control of the normal mode device that the flow of intake air is regulated according to the traveling of the vehicle without regeneration of a DPF device 104 or an LNT device 102 provided on an exhaust passage 70 of the vehicle. The control of an opening degree of the variable valve in the normal mode device that the opening degree can be adjusted to satisfy the formation level of a swirl required in the engine conditions of the vehicle.

In the instant case, the controller 150 may cause intake air to evenly flow into the combustion chamber by stopping the operation of both of the variable valve 160 and the operation valve 170, as illustrated in FIG. 3.

Furthermore, the controller 150 may close the first division passage 114 by rotating the variable valve 160 and open the second division passage 116 by controlling the operation valve 170 to be maintained in an OFF state, achieving full combustion by inducing formation of a swirl in the combustion chamber, as illustrated in FIG. 4.

That is, the controller 150 may cause the operation valve 170 to be maintained in an OFF state to increase combustion efficiency of fuel in the combustion chamber in the typical traveling condition of the vehicle, and may adjust the opening degree of the variable valve 160 to satisfy the formation level of a swirl required in the combustion chamber.

Here, the second division passage 116 is opened when the operation valve 170 is turned off and the second division passage 116 is closed when the operation valve 170 is turned on.

In the various exemplary embodiments, the controller 150 controls the angle of rotation of the motor 140 to close the variable valve 160 and closes the second division passage 116 by the ON control of the operation valve 170, in the regeneration mode of the LNT device 102 provided on the exhaust passage 70.

Various aspects of the present invention are directed to providing the LNT device 102 on the exhaust passage 170 for removal of harmful substances from exhaust. The LNT device 102 is mainly used to reduce nitrogen oxides of incomplete combustion in exhaust.

The regeneration mode of the LNT device 102 is set in the controller 150, and it is necessary to reduce an amount of intake air in the regeneration mode of the LNT device 102. This may also bring about an effect of reducing nitrogen oxides of incomplete combustion itself in exhaust in the regeneration process of the LNT device 102.

Meanwhile, to reduce an amount of intake air in the regeneration mode of the LNT device 102, the controller 150 closes the first division passage 114 by changing the opening degree of the variable valve 160 and closes the second division passage 116 by the ON control of the operation valve 170, as illustrated in FIG. 5.

Figure 6:
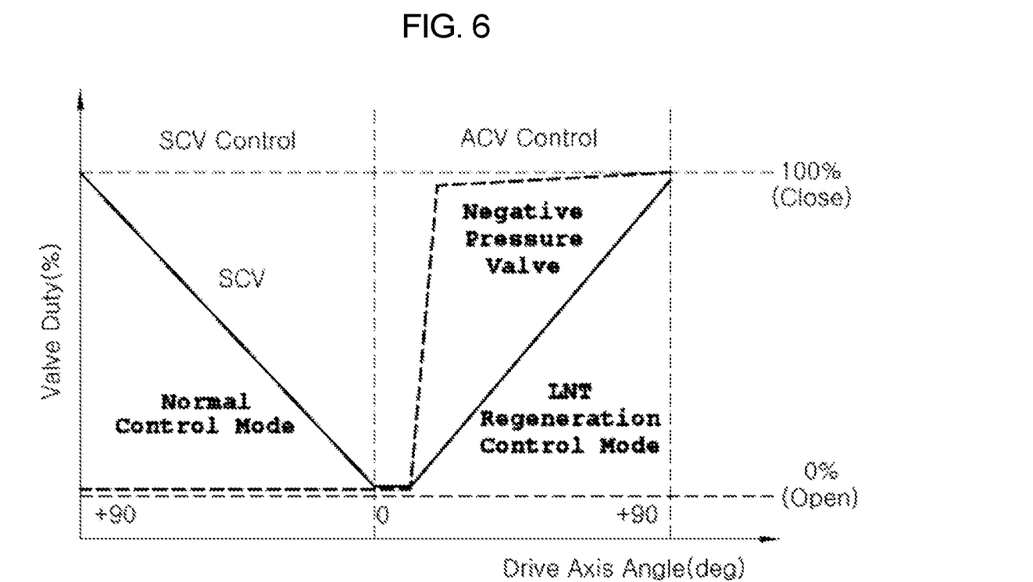
FIG. 6 is a graph illustrating a change in opening degree of variable and operation valves depending on the vehicle mode in the air intake control apparatus for a vehicle according to the various exemplary embodiments of the present invention.

FIG. 6 is a graph illustrating a change in opening degree of variable and operation valves depending on the vehicle mode in the air intake control apparatus for a vehicle according to the various exemplary embodiments of the present invention.

Referring to FIG. 6, the opening degree of the swirl control valve (SCV) as the variable valve is changed depending on the angle of rotation of the motor, and the negative pressure valve as the operation valve is turned on or off depending on the control of a separate controller.

Here, the open state, in which the duties of both variable and operation valves are 0%, is defined as a reference state.

When the vehicle is in the normal mode, the controller adjusts the duty value of the variable valve so that intake air may flow into the combustion chamber by adjusting formation of a swirl in the combustion chamber.

In the case where the vehicle is in the LNT regeneration mode, the controller increases the duty value of the variable valve and controls the operation valve to be turned on, so that LNT regeneration may be smoothly performed by blocking the introduction of intake air into the combustion chamber.

Figure 7:
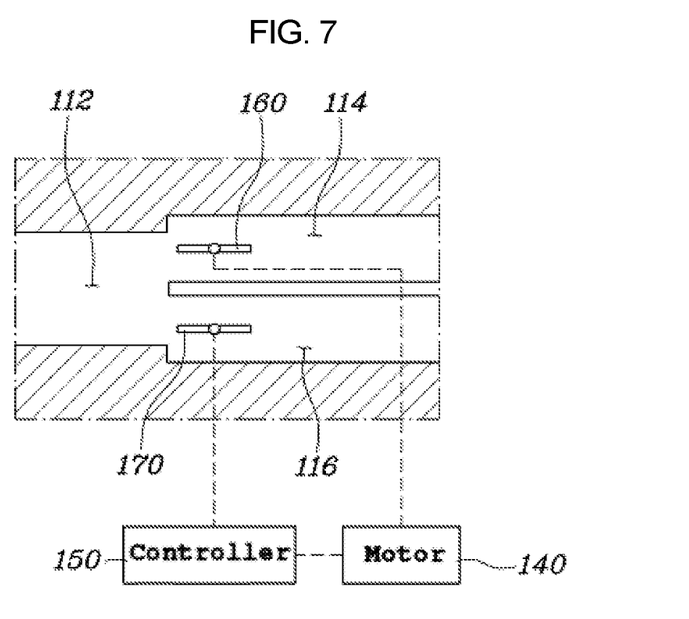
FIG. 7 is a view illustrating a reference state of an air intake control apparatus for a vehicle according to various exemplary embodiments of the present invention.
Figure 8:
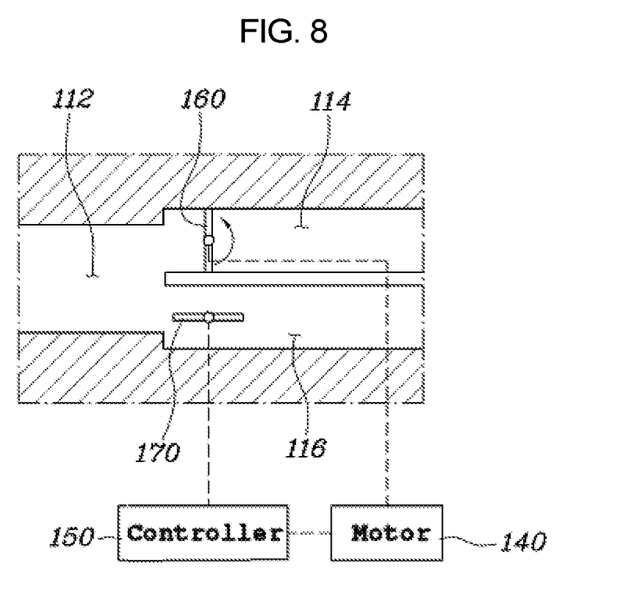
FIG. 8 is a view illustrating a state in which a variable valve is closed and an operation valve is turned off in the air intake control apparatus for a vehicle according to the various exemplary embodiments of the present invention.
Figure 9:
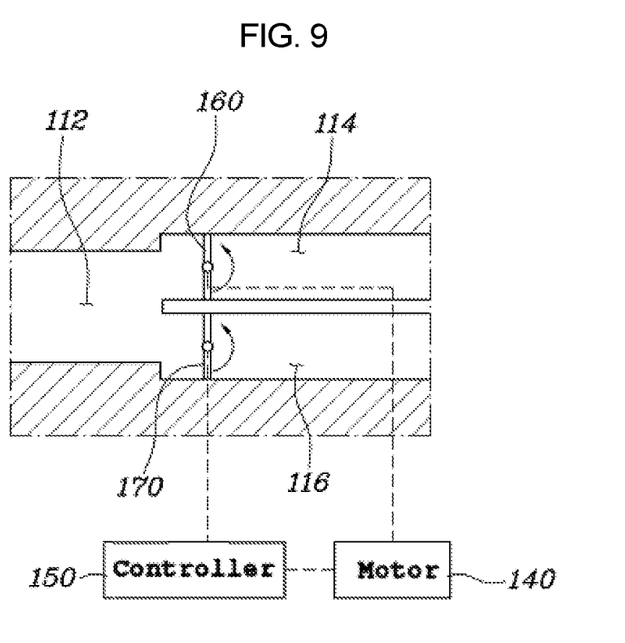
FIG. 9 is a view illustrating a state in which the variable valve is closed and the operation valve is turned on in the air intake control apparatus for a vehicle according to the various exemplary embodiments of the present invention.

Meanwhile, FIG. 7 is a view illustrating a reference state of an air intake control apparatus for a vehicle according to various exemplary embodiments of the present invention. FIG. 8 is a view illustrating a state in which a variable valve is closed and an operation valve is turned off in the air intake control apparatus for a vehicle according to the various exemplary embodiments of the present invention. FIG. 9 is a view illustrating a state in which the variable valve is closed and the operation valve is turned on in the air intake control apparatus for a vehicle according to the various exemplary embodiments of the present invention.

Referring to FIGS. 7 to 9, in the air intake control apparatus for a vehicle according to the various exemplary embodiments of the present invention, a first division passage 114 is a swirl port that communicates with an eccentric point in a combustion chamber to induce a swirl in the combustion chamber, and a second division passage 116 is a filling port communicating with the combustion chamber.

That is, in the various exemplary embodiments, a variable valve 160 adjusts the opening degree of the first division passage 114 as the swirl port by the operation of a motor, and an operation valve 170 is configured to open or close the second division passage 116 as the filling port by ON/OFF control.

Especially, in the various exemplary embodiments, a controller 150 controls the angle of rotation of a motor 140 to adjust the opening degree of the variable valve 160 and controls the operation valve 170 to be turned off such that the second division passage 116 is maintained in an open state, in the regeneration mode of the DPF device 104 provided on the exhaust passage, as illustrated in FIG. 8.

The DPF device 104 provided on the exhaust passage 70 is a device that removes harmful substances contained in the exhaust of the vehicle, carbon substances or particle materials (PMs) of incomplete combustion.

Although the DPF device 104 may be operated in various manners, the DPF device 104 according to the various exemplary embodiments of the present invention adopts a regeneration method of collecting PMs in exhaust and removing PMs by combustion when the amount of the collected PMs is equal to or greater than a limited amount.

Meanwhile, in the regeneration mode of the DPF device 104, the controller 150 closes the first division passage 114 as the swirl port by decreasing the opening degree of the variable valve 160 and opens the second division passage 116 as the filling port by the OFF control of the operation valve 170, to reduce an amount of intake air and increase combustion substances (for instance, non-combusted fuel) in exhaust such that combustion may be performed in the DPF device 104.

Furthermore, in the various exemplary embodiments, the controller 150 may close the first division passage 114 by controlling the angle of rotation of the motor 140 to close the variable valve 160 and close the second division passage 116 by the ON control of the operation valve 170, in the regeneration mode of the LNT device 102 provided on the exhaust passage, as illustrated in FIG. 9.

Figure 10:
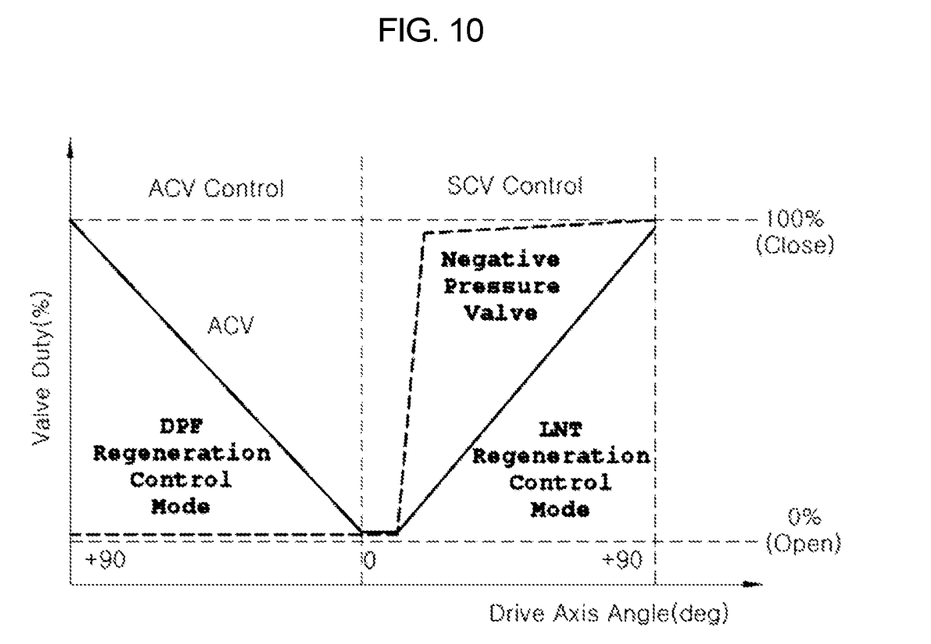
FIG. 10 is a graph illustrating a change in opening degree of variable and operation valves depending on the vehicle mode in the air intake control apparatus for a vehicle according to the various exemplary embodiments of the present invention.

FIG. 10 is a graph illustrating a change in opening degree of variable and operation valves depending on the vehicle mode in the air intake control apparatus for a vehicle according to the various exemplary embodiments of the present invention.

Referring to FIG. 10, the opening degree of the air control valve (ACV) as the variable valve is changed depending on the angle of rotation of the motor, and the negative pressure valve as the operation valve is turned on or off depending on the control of a separate controller.

Here, the open state, in which the duties of both variable and operation valves are 0%, is defined as a reference state.

When the vehicle is in the DPF regeneration mode, the controller adjusts the duty value of the variable valve to regulate an air amount introduced into the combustion chamber, so as not to form a swirl in the combustion chamber.

In the case where the vehicle is in the LNT regeneration mode, the controller increases the duty value of the variable valve and controls the operation valve to be turned on, so that LNT regeneration may be smoothly performed by blocking the introduction of intake air into the combustion chamber.

In accordance with the air intake control apparatus for a vehicle having the above-mentioned structure, it can have a simple structure and simultaneously regulate the flow of intake air by controlling the plurality of valves according to the mode of the vehicle.

Since the variable valve is operated by the motor and the operation valve is controllable using the negative pressure of the intake device in an exemplary embodiment of the present invention, it is possible to reduce power consumption and volume package due to application of a large number of motors.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air intake control apparatus for a vehicle, the air intake control apparatus comprising:
   an intake passage including a flow pipe, wherein the flow pipe for a flow of intake air is divided into a first division passage and a second division passage and wherein the first and second division passages fluidically-communicate with a same combustion chamber;

a variable valve provided in the first division passage to adjust an opening amount of the first division passage, wherein the opening amount of the first division passage is determined by a rotation angle of a motor connected to a central shaft of the variable valve;

an operation valve provided in the second division passage to open or close the second division passage by ON/OFF control;

a controller configured to control the rotation angle of the motor according to a traveling mode of the vehicle to adjust a rotation angle of the variable valve, and to control the operation valve in an ON/OFF manner; and a Lean NOx Trap (LNT) device provided on an exhaust passage connected to the same combustion chamber, wherein the operation valve is a negative pressure valve, wherein the first division passage is a filling port communicating with the combustion chamber, and the second division passage is a swirl port that communicates with an eccentric point in the same combustion chamber to induce a swirl in the same combustion chamber, and wherein the controller is configured to control the rotation angle of the motor of the variable valve to close the first division passage and to close the second division passage, in a regeneration mode of the Lean NOx Trap (LNT) device.

2. The air intake control apparatus according to claim 1, wherein the controller is configured to control the rotation angle of the motor to adjust the rotation angle of the variable valve and the second division passage to be maintained in an open state, in a normal mode corresponding to a normal traveling condition of the vehicle.

3. An air intake control apparatus for a vehicle, the air intake control apparatus comprising;

an intake passage including a flow pipe, wherein the flow pipe for a flow of intake air is divided into a first division passage and a second division passage and wherein the first and second division passages fluidically-communicate with a same combustion chamber;

a variable valve provided in the first division passage to adjust an opening amount of the first division passage, wherein the opening amount of the first division passage is determined by a rotation angle of a motor connected to a central shaft of the variable valve;

an operation valve provided in the second division passage to open or close the second division passage by ON/OFF control;

a controller configured to control the rotation angle of the motor according to a traveling mode of the vehicle to adjust a rotation angle of the variable valve, and to control the operation valve in an ON/OFF manner; and a Lean NOx Trap (LNT) device provided on an exhaust passage connected to the same combustion chamber, wherein the operation valve is a negative pressure valve, and wherein the first division passage is a swirl port that communicates with an eccentric point in the same combustion chamber to induce a swirl in the same combustion chamber, and the second division passage is a filling port communicating with the same combustion chamber.

4. The air intake control apparatus according to claim 3, wherein the controller is configured to control the rotation angle of the motor to adjust the rotation angle of the variable valve and causes the second division passage to be maintained in an open state, in a regeneration mode of a diesel particulate filter (DPF) device provided on the exhaust passage.

5. The air intake control apparatus according to claim 3, wherein the controller is configured to control the rotation angle of the motor of the variable valve to close the first division passage and closes the second division passage in a regeneration mode of a Lean NOx Trap (LNT) device provided on the exhaust passage.

* * * * *